United States Patent
Lee et al.

(10) Patent No.: US 10,680,687 B2
(45) Date of Patent: Jun. 9, 2020

(54) METHOD FOR MAPPING, TRANSMITTING, OR RECEIVING UPLINK CONTROL INFORMATION IN WIRELESS COMMUNICATION SYSTEM AND DEVICE FOR SAME

(71) Applicant: LG ELECTRONICS INC., Seoul (KR)

(72) Inventors: Hyunho Lee, Seoul (KR); Daesung Hwang, Seoul (KR); Seungmin Lee, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/070,203

(22) PCT Filed: Feb. 3, 2017

(86) PCT No.: PCT/KR2017/001208
§ 371 (c)(1),
(2) Date: Jul. 13, 2018

(87) PCT Pub. No.: WO2017/135745
PCT Pub. Date: Aug. 10, 2017

(65) Prior Publication Data
US 2019/0028162 A1    Jan. 24, 2019

Related U.S. Application Data

(60) Provisional application No. 62/290,942, filed on Feb. 4, 2016, provisional application No. 62/316,579, filed (Continued)

(51) Int. Cl.
*H04B 7/0456* (2017.01)
*H04B 7/06* (2006.01)
(Continued)

(52) U.S. Cl.
CPC ......... *H04B 7/0486* (2013.01); *H04B 7/0626* (2013.01); *H04B 7/0639* (2013.01);
(Continued)

(58) Field of Classification Search
CPC .. H04B 7/0486; H04B 7/0626; H04B 7/0639; H04L 1/1861; H04L 5/0048; H04L 5/0053; H04W 72/0413
See application file for complete search history.

(56) References Cited

U.S. PATENT DOCUMENTS

| | | | |
|---|---|---|---|
| 7,076,594 B2 * | 7/2006 | Benedetto | G06F 1/00 |
| 2007/0159988 A1 * | 7/2007 | Khan | H04L 12/28 |

(Continued)

FOREIGN PATENT DOCUMENTS

| | | |
|---|---|---|
| KR | 10-2014-0009995 A | 1/2014 |
| KR | 10-2014-0017502 A | 2/2014 |

(Continued)

OTHER PUBLICATIONS

Ericcson, "Study of shorter TTI for latency reduction," 3GPP TSG-RAN WG2 #91bis, R2-154740, Malmö, Sweden, Oct. 5-9, 2015 (server date; downloaded by EPO Sep. 26, 2015), pp. 1-8, XP051023965.

*Primary Examiner* — Ronald B Abelson
(74) *Attorney, Agent, or Firm* — Birch, Stewart, Kolasch & Birch, LLP

(57) ABSTRACT

A method for mapping, as uplink data channel resource, uplink control information for a terminal configured to support multiple transmission time interval (TTI) lengths in a wireless communication system, according to one embodiment of the present invention, wherein the method is carried out by the terminal, comprises the steps of: mapping an encoding symbol for a rank indicator (RI) on each resource element, in an ascending order of a frequency index begin- (Continued)

ning with a resource element of the minimum frequency index, from on a second symbol adjacent to a first symbol onto which an uplink reference signal is mapped in an uplink data channel resource in a TTI having a specific length from the multiple TTI lengths; and mapping an encoding symbol for a channel quality indicator (CQI) or a precoding matrix indicator (PMI) on each of the resource elements, in an ascending order of the frequency index beginning with the resource element of the minimum frequency index or in a descending order of the frequency index beginning with a resource element of the maximum frequency index, from on a specific symbol of the uplink data channel resource.

14 Claims, 10 Drawing Sheets

Related U.S. Application Data on Apr. 1, 2016, provisional application No. 62/335,690, filed on May 13, 2016, provisional application No. 62/338,462, filed on May 18, 2016, provisional application No. 62/373,964, filed on Aug. 11, 2016, provisional application No. 62/437,765, filed on Dec. 22, 2016.

(51) Int. Cl.
  *H04L 5/00* (2006.01)
  *H04L 1/18* (2006.01)
  *H04W 72/04* (2009.01)

(52) U.S. Cl.
  CPC .......... *H04L 1/1861* (2013.01); *H04L 5/0048* (2013.01); *H04L 5/0053* (2013.01); *H04L 5/0055* (2013.01); *H04L 5/0057* (2013.01); *H04W 72/0413* (2013.01); *H04L 5/0007* (2013.01)

(56) References Cited

U.S. PATENT DOCUMENTS

| | | |
|---|---|---|
| 2011/0310780 A1 | 12/2011 | Xiao et al. |
| 2014/0219210 A1 | 8/2014 | Lunttila et al. |
| 2014/0286255 A1 | 9/2014 | Nam et al. |
| 2016/0056942 A1 | 2/2016 | Wang et al. |

FOREIGN PATENT DOCUMENTS

| | | |
|---|---|---|
| WO | WO 2011/082828 A1 | 7/2011 |
| WO | WO 2014/046374 A1 | 3/2014 |
| WO | WO 2014/175964 A1 | 11/2014 |

* cited by examiner

FIG. 6
| 0 | 1 | 2 | ░ | 3 | 4 | 5 | 6 | 7 | 8 | ░ | 9 | 10 | 11 |
|---|---|---|---|---|---|---|---|---|---|---|---|---|---|
| 12 | 13 | 14 | ░ | 15 | 16 | 17 | 18 | 19 | 20 | ░ | 21 | 22 | 23 |
| 24 | 25 | 26 | ░ | 27 | 28 | 29 | 30 | 31 | 32 | ░ | 33 | 34 | 35 |
| 36 | 37 | 0 | ░ | 1 | 2 | 3 | 4 | 5 | 6 | ░ | 7 | 8 | 9 |
| 10 | 11 | 12 | ░ | 13 | 14 | 15 | 16 | 17 | 18 | ░ | 19 | 20 | 21 |
| 22 | 24 | 23 | ░ | 24 | 25 | 26 | 27 | 26 | 28 | ░ | 29 | 25 | 30 |
| 31 | 20 | 20 | ░ | 33 | 23 | 34 | 35 | 22 | 36 | ░ | 21 | 21 | 38 |
| 39 | 16 | 16 | ░ | 19 | 19 | 42 | 43 | 18 | 18 | ░ | 17 | 17 | 46 |
| 47 | 12 | 12 | ░ | 15 | 15 | 50 | 51 | 14 | 14 | ░ | 13 | 13 | 54 |
| 55 | 8 | 8 | ░ | 11 | 11 | 58 | 59 | 10 | 10 | ░ | 9 | 9 | 62 |
| 63 | 4 | 4 | ░ | 7 | 7 | 66 | 67 | 6 | 6 | ░ | 5 | 5 | 70 |
| 71 | 0 | 0 | ░ | 3 | 3 | 74 | 75 | 2 | 2 | ░ | 1 | 1 | 78 |
 RI  CQI/PMI  U-SCH  A/N  RS FIG. 7
Option 1     Option 2-a     Option 2-b
 DM-RS    A/N    RI    CQI/PMI

METHOD FOR MAPPING, TRANSMITTING, OR RECEIVING UPLINK CONTROL INFORMATION IN WIRELESS COMMUNICATION SYSTEM AND DEVICE FOR SAME

CROSS REFERENCE TO RELATED APPLICATIONS

This application is the National Phase of PCT International Application PCT/KR2017/001208, filed on Feb. 3, 2017, which claims priority under 35 U.S.C. 119(e) to U.S. Provisional Application No. 62/290,942, filed on Feb. 4, 2016, 62/316,579 filed on Apr. 1, 2016, 62/335,690 filed on May 13, 2016, 62/338,462, filed on May 18, 2016, 62/373, 964 filed on Aug. 11, 2016 and 62/437,765 filed on Dec. 22, 2016, all of which are hereby expressly incorporated by reference into the present application,

TECHNICAL FIELD

The present invention relates to a wireless communication system, and more particularly, to a method of mapping, transmitting, or receiving uplink control information in a wireless communication system and an apparatus therefor.

BACKGROUND ART

In a wireless cellular communication system, discussion on a transmission/reception method capable of reducing latency as much as possible is in progress. In particular, according to the method, data is transmitted as soon as possible within a short time period using a short TTI (transmission time interval) for a service/UE sensitive to latency and a response is transmitted within a short time period in response to the data. On the contrary, it is able to transmit/receive data using a longer TTI for a service/UE less sensitive to latency. For a service/UE sensitive to power efficiency rather than latency, it may be able to repeatedly transmit data using the same low power or transmit data by more extending TTI. The present invention proposes a method of allocating, transmitting or receiving a resource of uplink control information for enabling the abovementioned operation.

DISCLOSURE OF THE INVENTION

Technical Task

A technical task of the present invention is to provide a method of allocating, transmitting or receiving a resource of uplink control information in a wireless communication system and an operation related to the method.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of mapping uplink control information to an uplink data channel resource by a terminal configured to support multiple TTI (transmission time interval) lengths in a wireless communication system, may include mapping coded symbols for a rank indicator (RI) to each resource element in an ascending order of a frequency index from a resource element of a minimum frequency index in a second symbol adjacent to a first symbol to which an uplink reference signal is mapped in an uplink data channel resource within a TTI of a predetermined length among the multiple TTI lengths, and mapping coded symbols for a channel quality indicator (CQI) or a precoding matrix indicator (PMI) to each resource element in an ascending order of a frequency index from a resource element of a minimum frequency index or in a descending order of a frequency index from a resource element of a maximum frequency index in a predetermined symbol of the uplink data channel resource.

Additionally or alternatively, if there are remaining coded symbols for the CQI or PMI after mapping is performed to the resource element of the maximum frequency index in the specific symbol, the remaining coded symbols for the CQI or PMI may be mapped to each resource element in an ascending order of a frequency index from the resource element of the minimum frequency index in a next symbol of the predetermined symbol.

Additionally or alternatively, the method may further include mapping coded symbols for ACK/NACK (acknowledgement/non-acknowledgement) to each resource element in a descending order of a frequency index from the resource element of a maximum frequency index in the second symbol.

Additionally or alternatively, an offset value for calculating the number of coded symbols of uplink control information to be transmitted via an uplink data channel resource within the TTI may be determined according to a length of the TTI or a subcarrier spacing of the TTI.

Additionally or alternatively, the maximum number of symbols to which coded symbols of uplink control information is mapped in an uplink data channel resource within the TTI can be determined according to a length of the TTI.

Additionally or alternatively, power for transmitting the uplink data channel resource can be determined based on the number of resource elements except for resource elements to which uplink control information is mapped within the TTI.

Additionally or alternatively, when multiple TTIs sharing the uplink reference signal are scheduled to the terminal, an coded symbol for the uplink control information may be mapped within a TTI in which the uplink reference signal is mapped or transmitted.

Additionally or alternatively, the coded symbols for the CQI or the PMI can be mapped to a resource element of an RB (resource block) of a minimum index or a maximum index among RBs except for an RB to which the coded symbols for the RI is mapped.

Additionally or alternatively, the predetermined symbol may correspond to a symbol closest to the first symbol among symbols except for the second symbol in the uplink data channel resource.

Additionally or alternatively, when the predetermined symbol corresponds to the second symbol, the coded symbols for the CQI or the PMI may be mapped to each resource element in an ascending order of a frequency index or in a descending order of a frequency index from a frequency index apart from a resource to which the coded symbols for the RI is mapped by a predefined size.

To further achieve these and other advantages and in accordance with the purpose of the present invention, according to a different embodiment, a terminal configured to support multiple TTI (transmission time interval) lengths in a wireless communication system includes a transmitter and a receiver, and a processor that control the transmitter and the receiver, the processor maps coded symbols for a rank indicator (RI) to each resource element in an ascending order of a frequency index from a resource element of a minimum frequency index in a second symbol adjacent to a first symbol to which an uplink reference signal is mapped in an uplink data channel resource within a TTI of a predetermined length among the multiple TTI lengths, maps coded symbols for a channel quality indicator (CQI) or a precoding matrix indicator (PMI) to each resource element in an ascending order of a frequency index from a resource element of a minimum frequency index or in a descending order of a frequency index from a resource element of a maximum frequency index in a predetermined symbol of the uplink data channel resource.

Additionally or alternatively, if there are remaining coded symbols for the remaining CQI or PMI after mapping is performed to the resource element of the maximum frequency index in the predetermined symbol, the remaining coded symbols for the remaining CQI or PMI may be mapped to each resource element in an ascending order of a frequency index from the resource element of the minimum frequency index in a next symbol of the predetermined symbol.

Additionally or alternatively, the processor may maps coded symbols for ACK/NACK (acknowledgement/non-acknowledgement) to each resource element in a descending order of a frequency index from the resource element of a maximum frequency index in the second symbol.

Additionally or alternatively, an offset value for calculating the number of coded symbols of uplink control information to be transmitted via an uplink data channel resource within the TTI may be determined according to a length of the TTI or a subcarrier spacing of the TTI.

Additionally or alternatively, the maximum number of symbols to which coded symbols of uplink control information is mapped in an uplink data channel resource within the TTI can be determined according to a length of the TTI.

Additionally or alternatively, power for transmitting the uplink data channel resource can be determined based on the number of resource elements except for resource elements to which uplink control information is mapped within the TTI.

Additionally or alternatively, when multiple TTIs sharing the uplink reference signal are scheduled to the terminal, an coded symbol for the uplink control information can be mapped within a TTI in which the uplink reference signal is mapped or transmitted.

Additionally or alternatively, the coded symbols for the CQI or the PMI can be mapped to a resource element of an RB (resource block) of a minimum index or a maximum index among RBs except for an RB to which the coded symbols for the RI is mapped.

Additionally or alternatively, the predetermined symbol may correspond to a symbol closest to the first symbol among symbols except for the second symbol in the uplink data channel resource.

Additionally or alternatively, when the predetermined symbol corresponds to the second symbol, the coded symbols for the CQI or the PMI may be mapped to each resource element in an ascending order of a frequency index or in a descending order of a frequency index from a frequency index apart from a resource to which the coded symbols for the RI is mapped by a predefined size.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to make uplink control information to be efficiently mapped, transmitted, or received in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 6 illustrates resource allocation or a mapping pattern of a legacy uplink data channel;

FIG. 7 illustrates resource allocation or a mapping pattern of an uplink data channel according to one embodiment of the present invention;

BEST MODE

Mode for Invention

Figure 1:
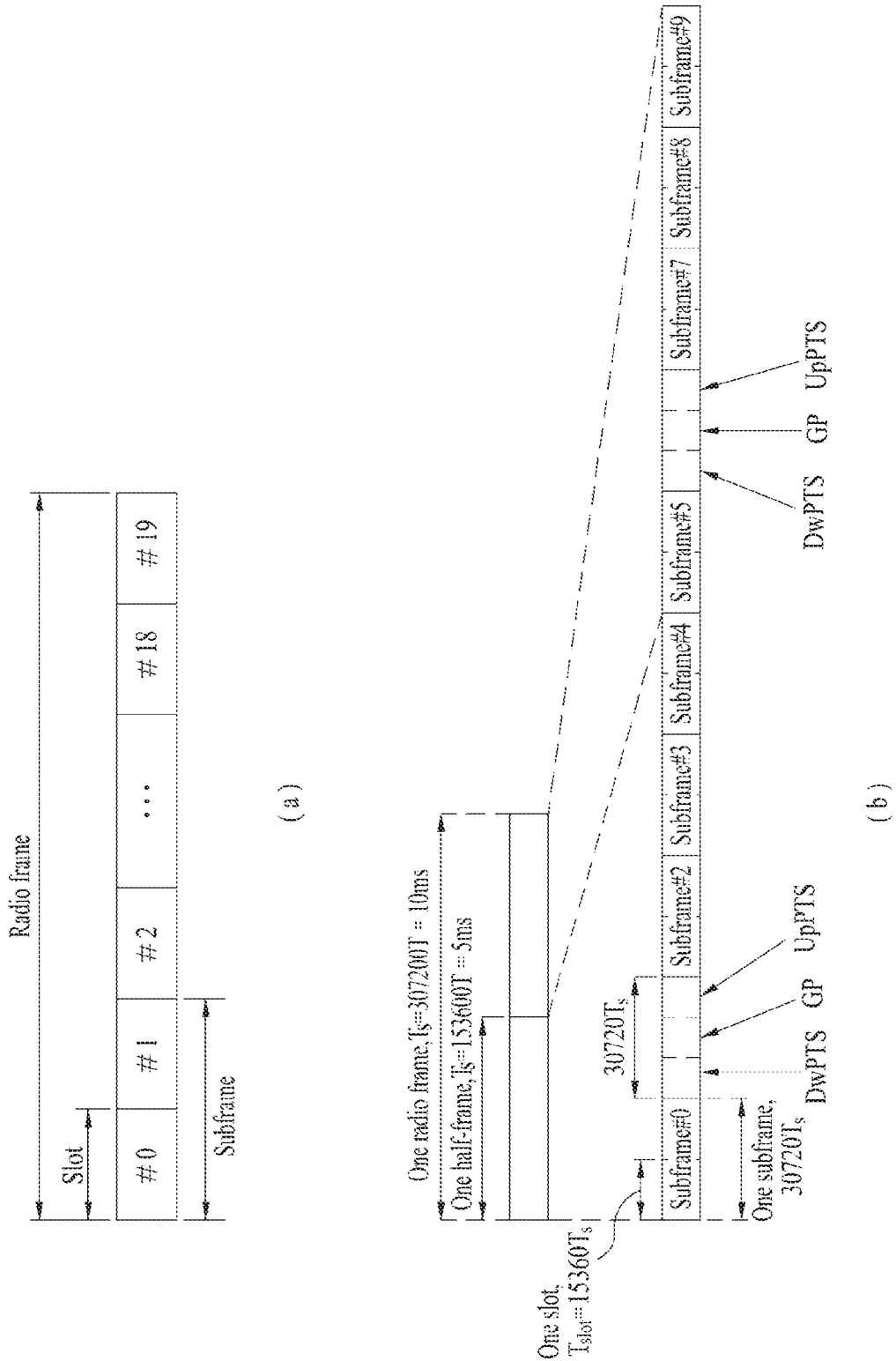
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and sub-carriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
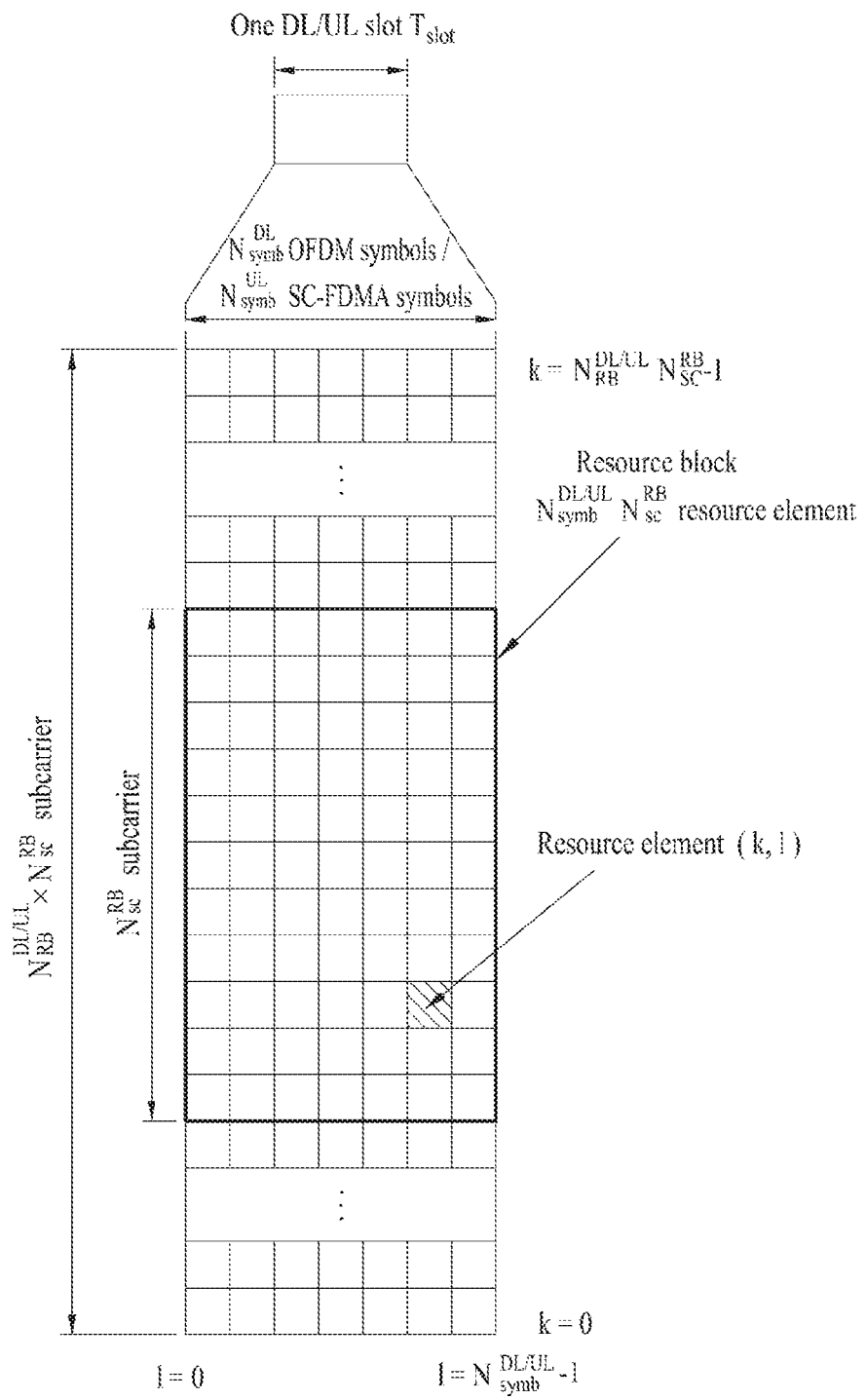
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0)) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$=REs. Each RE in a resource grid can be uniquely defined by an index pair (k, l) in a slot. Here, k is an index in the range of 0 to $N_{symb}^{DL/UL} * N_{sc}^{RB}-1$ in the frequency domain and l is an index in the range of 0 to $N_{symb}^{DL/UL}-1$.

Two RBs that occupy N: consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
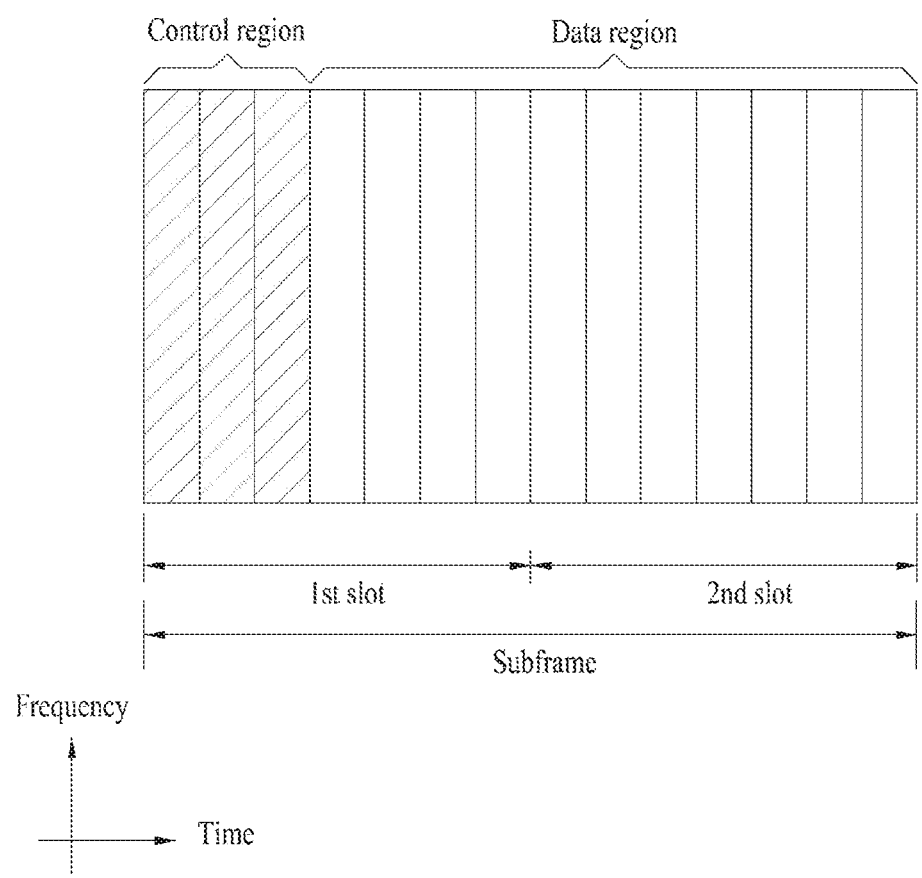
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of |
| --- | --- | --- | --- |
| Type | Aggregation Level L | Size [in CCEs] | PDCCH candidates $M^{(L)}$ |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
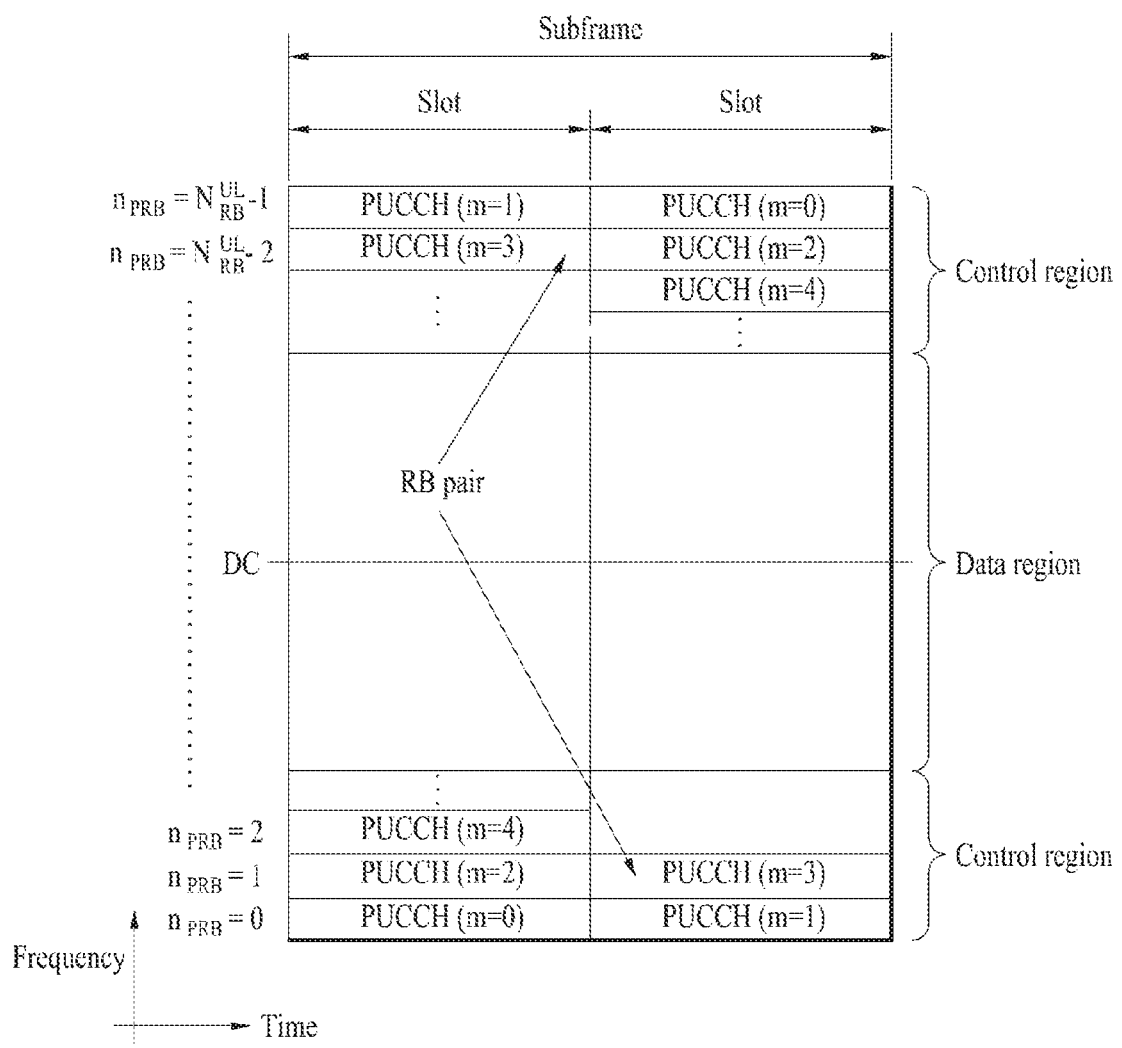
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.
    Scheduling Request (SR): This is information used to request a UL-SCH resource and is transmitted using On-Off Keying (OOK) scheme.
    HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.
    Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

The present invention relates to a method of providing a plurality of different services in a system by applying a different service parameter according to a service or a UE to satisfy a requirement of each of a plurality of the services. In particular, the present invention relates to a method of reducing latency as much as possible by transmitting data as soon as possible during a short time period using a short TTI (transmission time interval) for a service/UE sensitive to latency and transmitting a response within short time in response to the data. On the contrary, it may transmit and receive data using a longer TTI for a service/UE less sensitive to the latency. For a service/UE sensitive to power efficiency rather than the latency, it may repetitively transmit data with the same lower power or transmit data using a lengthened TTI. The present invention proposes a method of transmitting control information and a data signal for enabling the abovementioned operation and a multiplexing method.

For clarity, 1 ms currently used in LTE/LTE-A system is assumed as a basic TTI. A basic system is also based on LTE/LTE-A system. When a different service/UE is provided in a base station of LTE/LTE-A system based on a TTI of 1 ms (i.e., a subframe length), a method of transmitting a data/control channel having a TTI unit shorter than 1 ms is proposed for a service/UE sensitive to latency. In the following, a TTI of 1 ms is referred to as a normal TTI, a TTI of a unit smaller than 1 ms (e.g., 0.5 ms) is referred to as a short TTI, and a TTI of a unit longer than 1 ms (e.g., 2 ms) is referred to as a long TTI.

Figure 5:
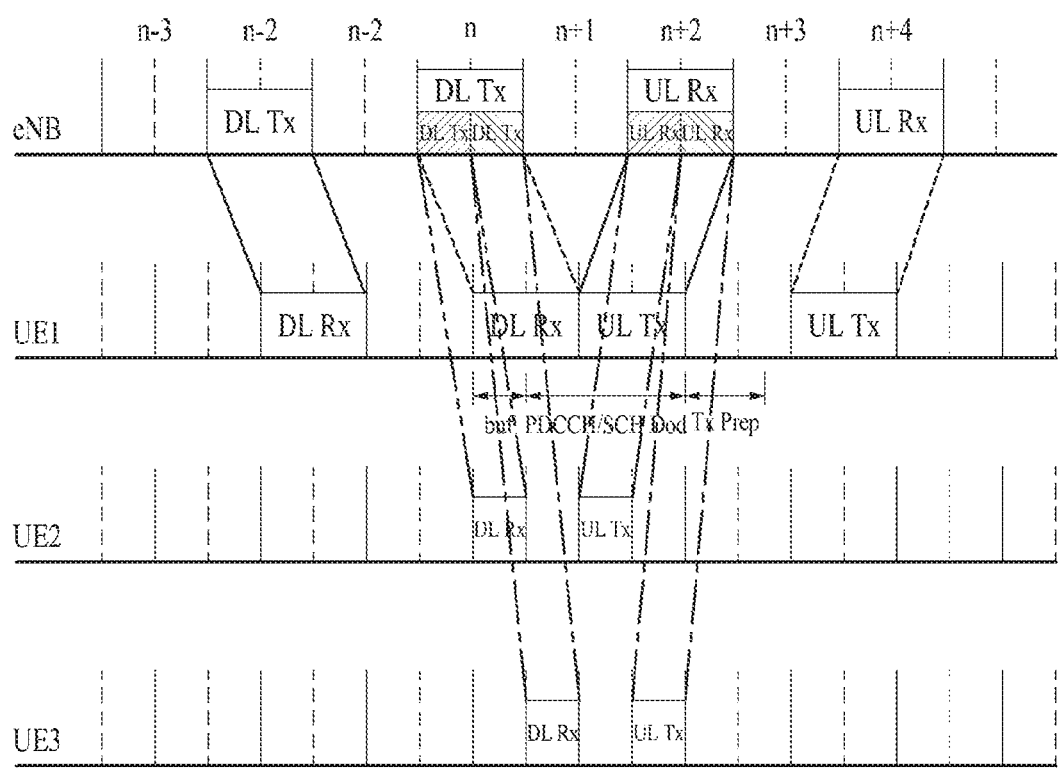
FIG. 5 is a diagram illustrating DL reception timing and UL transmission timing of UEs operating with a different TTI (transmission time interval)

First of all, a method of supporting a short TTI of a unit shorter than 1 ms in a system basically using a normal TTI of 1 ms unit used in legacy LTE/LTE-A system is described. First of all, downlink (DL) is explained. Multiplexing between channels having a different TTI size in an eNB and an example of uplink (UL) transmission for the multiplexing are shown in FIG. 5. As a TTI is getting shorter, time taken for a UE to buffer and decode a control channel and a data channel is getting shorter. Time taken for performing UL transmission in response to the control channel and the data channel is getting shorter. As shown in the example of FIG. 5, in case of transmission of 1 ms TTI, when a DL channel is transmitted in a specific n$^{th}$ subframe, an eNB can receive a response in an (n+$_4$)$^{th}$ subframe in response to the DL channel. In case of transmission of 0.5 TTI, when a DL channel is transmitted in a specific n$^{th}$ subframe, an eNB can receive a response in an (n+2)$^{th}$ subframe in response to the DL channel. In particular, in order to support TTIs of a different length, it is necessary to support backward compatibility to prevent an impact on a UE operating in a legacy system only for DL and UL multiplexing of channels having a different TTI.

When DL/UL channels having a different length of TTI are multiplexed, it is necessary to define a method for a UE, which has received the channels, to read a control channel and transmit/receive a data channel. A UE supporting a normal TTI only, a UE supporting a normal TTI and a short TTI, and a UE supporting a normal TTI, a short TTI, and a long TTI may coexist in a system. In this case, when a UE supports a short TTI and a normal TTI, it means that the UE is able to receive and demodulate both a channel transmitted with a short TTI ("short TTI channel") and a channel transmitted with a normal TTI ("normal TTI channel") and is able to generate and transmit the short TTI channel and the normal TTI channel in UL.

In a legacy LTE/LTE-A system, one subframe, i.e., a TTI, has a length of 1 ms and one subframe includes two slots. One slot corresponds to 0.5 ms. In case of a normal CP, one slot includes 7 OFDM symbols. A PDCCH (physical downlink control channel) is positioned at a forepart of a subframe and is transmitted over the whole band. A PDSCH (physical downlink shared channel) is transmitted after the PDCCH. PDSCHs of UEs are multiplexed on a frequency axis after a PDCCH section. In order for a UE to receive PDSCH of the UE, the UE should know a position to which the PDSCH is transmitted. Information on the position, MCS information, RS information, antenna information, information on a transmission scheme, information on a transmission mode (TM), and the like can be obtained via the PDCCH. For clarity, PDCCH having a short TTI and PDSCH having a short TTI are referred to as sPDCCH and sPDSCH, respectively. If a UE receives the sPDSCH, the UE transmits HARQ-ACK via a PUCCH (physical uplink control channel) in response to the sPDSCH. In this case, a PUCCH having a short TTI is referred to as sPUCCH.

Meanwhile, an evolved wireless communication system such as 3GPP LTE, and the like, classifies characteristic of information into UCI (uplink control information) and data in UL and designs PUCCH corresponding to a channel on which the UCI is transmitted and PUSCH (physical uplink shared channel) on which the data is transmitted to satisfy the characteristic of each information. Yet, when a UE is not configured to transmit the PUCCH and the PUSCH at the same time, if PUSCH transmission exists at the timing at which the UCI is transmitted, the UE transmit the UCI by piggybacking the UCI on the PUSCH. FIG. 6 illustrates a method of mapping ACK/NACK, RI (rank indicator), CQI (channel quality indicator)/PMI (precoding matrix indicator), etc. corresponding to the details of the UCI in a resource region when a CP corresponds to a normal CP (cyclic prefix) and the UCI is transmitted on the PUSCH. FIG. 6 illustrates a case of allocating a PUSCH resource using 1 RB in LTE system according to the embodiment of the present invention. In this case, a horizontal axis corresponds to SC-FDMA (single carrier frequency division multiple access) symbols and a vertical axis corresponds to subcarriers. In this case, a time index of the SC-FDMA symbol increases from the left to the right and a frequency index of the subcarrier increases from the top to the bottom.

And, each type of the UCI is represented by a different hatching. Numbers in the same region correspond to a mapping order of a coded symbol.

In this case, mapping is performed on CQI/PMI without considering a resource position of ACK/NACK. Hence, if the ACK/NACK occupies the entire SC-FDMA symbols, in FIG. 6, the CQI/PMI is punctured in a corresponding position.

When it is able to configure one or multiple TTI lengths (e.g., shorter than 1 ms) different from 1 ms TTI in legacy LTE/LTE-A system, the present invention proposes a method of transmitting UCI on a UL (uplink) data channel, i.e., a method of piggybacking the UCI on PUSCH.

UCI Mapping for Piggyback

Figure 8:
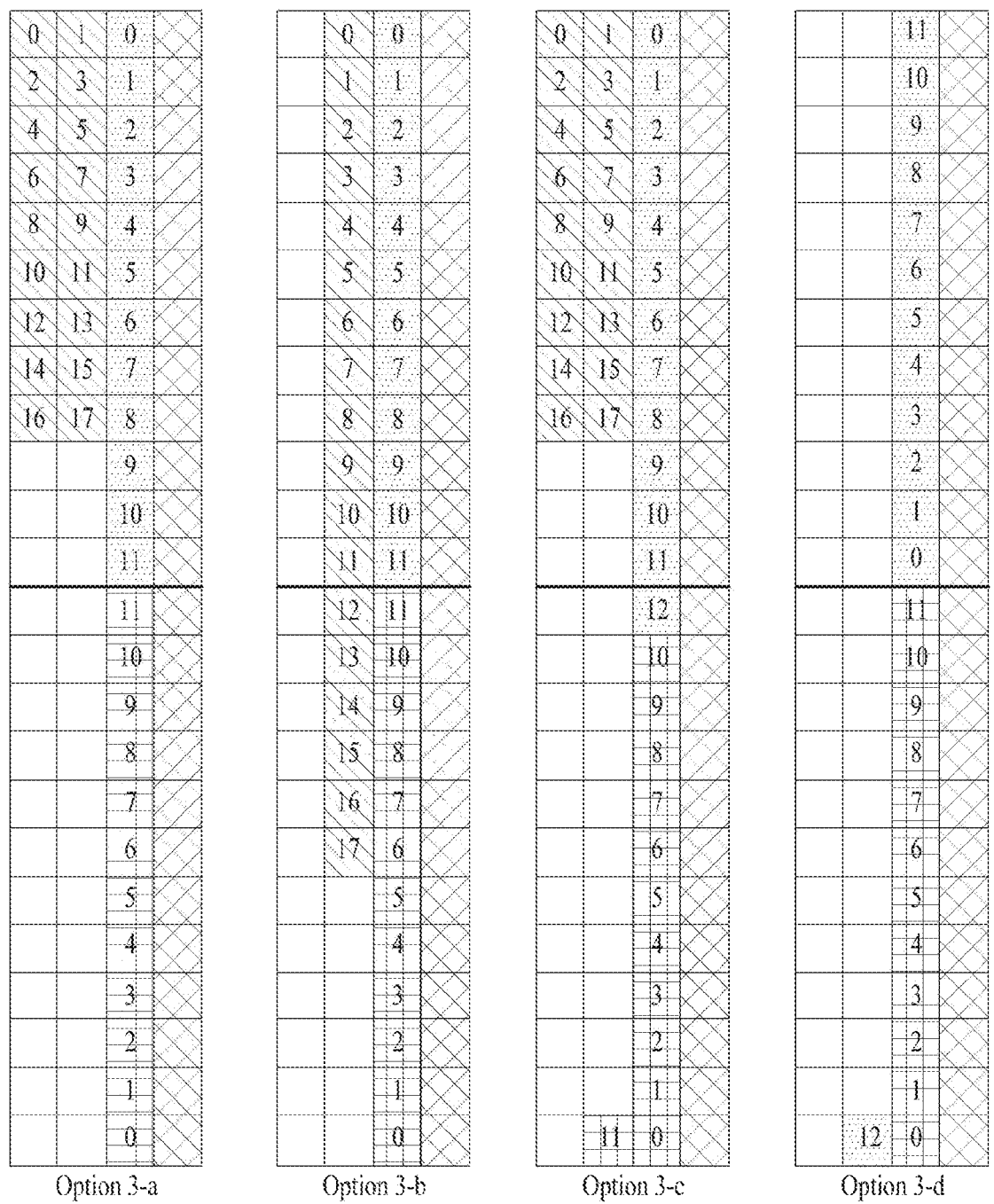
FIG. 8 illustrates resource allocation or a mapping pattern of an uplink data channel according to one embodiment of the present invention.

As a proposal, when a UE is able to configure one or multiple TTI lengths (e.g., shorter than 1 ms) different from 1 ms TTI of legacy LTE/LTE-A system, it may be able to define a rule that mapping of UCI is changed according to a TTI length of a cell in which PUSCH is transmitted. In the following, mapping changes of ACK/NACK, RI, and CQI/PMI resource and a mapping order are described in more detail. FIGS. 7 and 8 are diagrams illustrating a part of options described in the following.

In the following description, a minimum value (or minimum time index or minimum frequency index) and a maximum value (or maximum time index or maximum frequency index) of a time index or a frequency index correspond to values restricted in a single TTI.

Option 1: In case of mapping a single DM-RS symbol within a TTI or when DMRSs of two adjacent TTIs are transmitted in the same symbol, a CQI/PMI resource is allocated in an ascending order of a time index from a minimum index of the time index or a minimum index of a frequency index. If the time index becomes a maximum index, the frequency index is increased by 1 and the time index is increased again in an ascending order from the minimum index of the time index. In particular, it may be able to define a rule that a coded symbol for CQI/PMI is allocated to each resource element using time-first mapping. ACK/NACK resource can be allocated to an SC-FDMA symbol closest to a DM-RS symbol in a manner that a coded symbol is allocated in a descending order of a frequency index from a maximum index of the frequency index. An RI resource can be allocated to an SC-FDMA symbol closest to a DM-RS symbol except a symbol to which ACK/NACK resource is mapped in a manner that a coded symbol for RI is allocated to each resource element in a descending order of a frequency index from a maximum index of the frequency index. In this case, if CQI/PMI resource is already mapped to a specific RE to which ACK/NACK resource and an RI resource are mapped, it may perform puncturing on the CQI/PMI resource. This is aimed for preferentially transmitting ACK/NACK and RI while CQI/PMI is sacrificed when data and UCI are transmitted in a relatively small PUSCH resource due to the introduction of a shot TTI.

As a different method, a CQI/PMI resource is allocated to each resource element in ascending order or descending order of a time index from an index farthest from a DMRS symbol index and a minimum index of a frequency index to a time index closest to the DMRS symbol index. If the time index becomes a time index closest to the DMRS symbol index, a frequency index is increased by 1 and a coded symbol for CQI/PMI is allocated to each resource element in an ascending order or a descending order of a time index from an index farthest from the DMRS symbol index within a TTI.

Option 2-a: In case of mapping a single DM-RS symbol within a TTI or when DMRSs of two adjacent TTIs are transmitted in the same symbol, a coded symbol is allocated to ACK/NACK resource and RI resource using the rule identical to the rule of the option 1 and a coded symbol is allocated to a CQI/PMI resource using the time-first mapping. In this case, it may be able to define a rule that rate matching is to be performed on an RE to which the ACK/NACK resource and the RI resource are mapped to skip the RE. This is aimed for minimizing UCI loss.

As a different method, a coded symbol for CQI/PMI resource is allocated in an ascending order or a descending order of a time index from an index farthest from a DMRS symbol index and a minimum index of a frequency index to a time index closest to the DMRS symbol index. If the time index becomes a time index closest to the DMRS symbol index, a frequency index is increased by 1 and a coded symbol for CQI/PMI is allocated to each resource element in an ascending order or a descending order of a time index from an index farthest from the DMRS symbol index within a TTI. In this case, it may be able to define a rule that rate matching is performed on an RE to which ACK/NACK resource and an RI resource are mapped to skip the RE.

Option 2-b: Or, in case of RI resource and CQI/PMI resource, a coded symbol for RI or a coded symbol for CQI/PMI is allocated to each resource element using the time-first mapping and a coded symbol for ACK/NACK resource is allocated to each resource element in a descending order of a time index from a maximum index of the time index and a maximum index of a frequency index. If the time index becomes a minimum index, the frequency index is decreased by 1 and the coded symbol is allocated to each resource element again in a descending order of the time index from the maximum index of the time index. In this case, it may be able to define a rule that a position of the RI resource is preferentially mapped prior to the CQI/PMI.

As a different method, a coded symbol for RI or CQI/PMI is allocated to each resource element in an ascending order or a descending order of a time index from an index farthest from a DMRS symbol index and a minimum index of a frequency index to a time index closest to the DMRS symbol index. If the time index becomes a time index closest to the DMRS symbol index, a frequency index is increased by 1 and a coded symbol is allocated to each resource element in an ascending order or a descending order of a time index from an index farthest from the DMRS symbol index within a TTI. On the contrary, ACK/NACK resource is allocated to each resource element in an ascending order or a descending order of a time index from a time index closest to a DMRS symbol index and a maximum index of a frequency index to a time index farthest from the DMRS symbol index. If the time index becomes a time index farthest from the DMRS symbol index, a frequency index is decreased by 1 and a coded symbol is allocated to each resource element in an ascending order or a descending order of a time index from an index closest to the DMRS symbol index within a TTI Option 3-a: When a very short TTI is configured, if a method such as option 1 or the option 2-a is applied, it may fail to secure an SC-FDMA symbol for transmitting RI. Hence, it may be able to define rule that a coded symbol for RI is to be allocated to an SC-FDMA symbol closed to a DMRS symbol in an ascending order of a frequency index from a minimum index of the frequency index. It may define a rule that CQI/PMI is preferentially mapped and RI punctures a CQI/PMI resource element. Or, it may be able to define a rule that RI is mapped first and CQI/PMI performs rate matching to skip an RE to which the RI resource is mapped. In addition, if an RI resource is already mapped to a specific RE to which ACK/NACK resource is mapped, it may perform puncturing on the RE to which the RI resource is mapped.

Option 3-b: It may define a rule that a coded symbol for RI is allocated to an SC-FDMA symbol closed to a DMRS symbol in an ascending order of a frequency index from a minimum index of the frequency index and a coded symbol for CQI/PMI is allocated to SC-FDMA symbol closed to a DMRS symbol except for a symbol to which an RI resource is mapped in an ascending order of a frequency index from a minimum index of the frequency index. If the frequency index becomes a maximum frequency index, a coded symbol for CQI/PMI is allocated to an SC-FDMA symbol away from the SC-FDMA symbol as much as one time index in an ascending order of a frequency index from the minimum frequency index.

More generally, it may be able to define a rule that a coded symbol for CQI/PMI is to be allocated to each resource element in an descending or ascending order of a frequency index from a minimum (or maximum) index of the frequency index (or from a specific frequency index) within a specific time index. If a very short TI is configured, it may fail to secure an SC-FDMA symbol for transmitting CQI/PMI. In this case, the present method is more useful compared to a time-first mapping scheme applied to a legacy CQI/PMI.

Option 3-c: In order to minimize RI resource loss in the option 3-a, if a part of an RE to which ACK/NACK is mapped is collided with RI, it may be able to define a rule that a coded symbol for ACK/NACK is to be allocated to an SC-FDMA symbol of a next time index of a DM-RS symbol index in a descending order of a frequency index from a maximum index of the frequency index.

Option 3-d: More generally, it may be able to define a rule that a coded symbol for a specific UCI resource is to be allocated to each resource element in a descending or ascending order of a frequency index from an index closest to a DMRS symbol index. Specifically, it may be able to define a rule that a coded symbol for ACK/NACK resource, and/or RI resource, and/or CQI/PMI resource is to be allocated to each resource element in an ascending order of a frequency index from a time index closest to a DMRS symbol index and a minimum frequency index or in a descending order of a frequency index from a minimum frequency index within TTI.

In this case, the RI resource can be mapped from a resource element of a maximum (or minimum) frequency index, On the contrary, it may be able to define a rule that the ACK/NACK resource is mapped in a descending (ascending) order of a frequency index from (1) a resource element of a maximum (minimum) index among the remaining frequency indexes except for the mapped RI resource after mapping of the RI resource is finished, (2) a resource element of a maximum (minimum) index of an RB having a maximum (minimum) index among the remaining RB indexes except for an RB to which RI resource is mapped, or (3) a resource element of a frequency index away as much as a predefined/promised (signaled) size after the mapping of the RI resource is finished. If UCI mapping is not finished in an SC-FDMA symbol having a time index closest to a DMRS symbol within a TTI, it may be able to define a rule that the remaining coded symbol is to be allocated to each resource element in a symbol away from the DMRS symbol as much as a time index in a descending (ascending) order of a frequency index from a maximum (minimum) index of the frequency index again.

CQI/PMI resource is mapped to each resource element in a descending (ascending) order of a frequency index from (1) a resource element of a maximum (minimum) index among the remaining frequency indexes except for the mapped RI resource after mapping of the RI resource is finished, (2) a resource element of a maximum (minimum) frequency index of an RB having a maximum (minimum) index among the remaining RB indexes except for an RB to which RI resource is mapped, or (3) a resource element of a frequency index away as much as a frequency resource of a predefined/promised (signaled) size after the mapping of the RI resource is finished. Lastly, ACK/NACK resource can be mapped using a scheme similar to that of CQI/PMI.

Option 4: If UCI piggyback PUSCH is scheduled by DCI format 4 and/or two codewords are all enabled, it may be able to define a rule that ACK/NACK and RI are mapped to a codeword of which MCS is high and CQI/PMI is mapped to a codeword of which MCS is low. Or, it may be able to define a rule that ACK/NACK is mapped to a codeword of which MCS is high and RI and CQI/PMI are mapped to a codeword of which MCS is low. More generally, when UCI is piggybacked with a short TTI PUSCH, a codeword to which UCI is to be mapped can be promised/defined in advance or can be indicated via higher layer (or physical layer) signaling.

Option 5: 1 if a symbol TTI is set to a UE, it may be able to define a rule that the UE transmits ACK/NACK by classifying the ACK/NACK using a cyclic shift of PUSCH DMRS. The remaining UCI can be dropped. It may be able to define a rule that the above operation of the UE is enabled only when a specific signaling is indicated via higher layer (physical layer) signaling.

Option 6: If UCI is piggybacked, a resource in which UCI is to be transmitted can be defined/promised in advance or can be provided via higher layer signaling or physical layer signaling. For example, a resource in which UCI is to be transmitted can be allocated in a unit of an RB. Or, an RE in which mapping is to be started is configured and mapping can be performed from the RE. As a different example, when a specific resource is scheduled for PUSCH, it may be able to define a rule that a specific (relative) position of a resource in which UCI is to be transmitted is allocated in a unit of an RB or a unit of a specific resource having a predefined size.

Option 7: In case of applying comb-type DMRS mapping, it may be able to define a rule that specific UCI is preferentially mapped to an RE near a DMRS RE. Specifically, in case of applying comb-type DMRS mapping, when UCI is mapped to a data symbol, it may be able to define a rule that the UCI is preferentially mapped to a subcarrier index corresponding to a subcarrier to which a DMRS RE is mapped prior to a subcarrier index corresponding to a subcarrier to which DMRS RS is not mapped.

When comb-type DMRS mapping is applied, it may be able to define a rule that UCI is preferentially mapped to a data subcarrier in an SC-FDMA symbol of a time index to which DMRS is mapped prior to an SC-FDMA symbol of a time index to which DMRS is not mapped. This is aimed for obtaining a better channel estimation gain. Or, when the comb-type DMRS mapping is applied, it may be able to define a rule that UCI is not mapped to an SC-FDMA symbol of a time index to which a DMRS is mapped.

Option 8: It may be able to define a rule that specific UCI is to be dropped according to a length of a TTI during which UCI piggyback PUSCH is transmitted. Or, it may be able to define a rule that specific UCI is to be dropped according to a length of a TTI during which UCI piggyback PUSCH is transmitted and the number of RBs. In this case, as an example of UCI priority, ACK/NACK>RI>CQI/PMI can be defined. UCI can be dropped in an ascending order of a priority.

Option 9: Currently, in case of a normal TTI, ACK/NACK and RI piggybacked via PUSCH can be mapped to 4 SC-FDMA symbols, respectively. However, if a short TTI is introduced and a length of total TTIs is configured by a length equal to or shorter than 4 SC-FDMA symbols, it is difficult to apply the abovementioned rule. Hence, the maximum number of SC-FDMA symbols to which specific UCI is mapped can be differently and independently configured according to a length of a TTI during which UCI piggyback PUSCH is transmitted. The maximum number of SC-FDMA symbols to which specific UCI is mapped can be defined/promised in advance according to (1) a length of a TTI during which UCI piggyback PUSCH is transmitted or (2) can be configured/indicated to a UE via higher layer signaling or physical layer signaling.

The maximum number of SC-FDMA symbols to which the specific UCI is mapped may correspond to (1) an independent value individually determined according to the number of symbols corresponding to the UCI, (2) an independent value individually determined by a TTI length, or (3) an independent value individually determined by a TTI length group (specific multiple TTI lengths can be defined as a single TTI length group) and can be defined in advance or can be configured via higher layer signaling or physical layer signaling.

Figure 9:
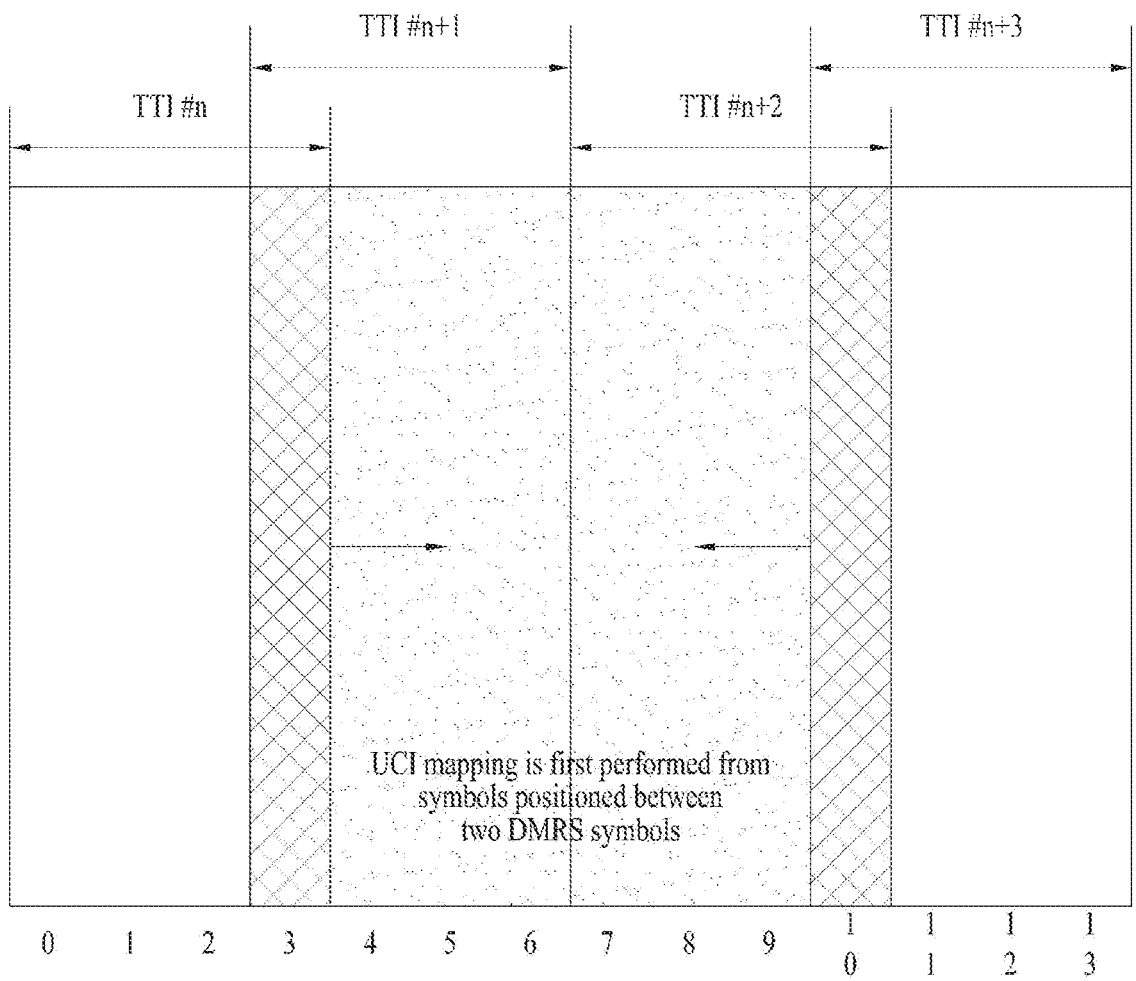
FIG. 9 illustrates a resource allocation method or a mapping pattern method of an uplink data channel according to one embodiment of the present invention.

It may be able to define a rule that UCI piggyback PUSCH is to be scheduled over a plurality of short TTIs rather than a single TTI. If the operation above is supported, a UCI piggyback mapping method can be differently defined for a case of transmitting PUSCH via a single short TTI and a case of transmitting PUSCH via a plurality of short TTIs. In particular, when PUSCH is transmitted via a plurality of short TTIs, it may be able to define a rule that UCI is to be preferentially mapped to a symbol close to each DMRS symbol. This is because it is able to expect enhancement of UCI reception performance via channel interpolation based on a plurality of DMRSs. For example, when two adjacent TTIs make a pair and use a symbol between the TTIs for DMRS mapping, if PUSCH is transmitted over three or more TTIs, as shown in FIG. 9, UCI can be preferentially mapped to X number of symbols from a symbol close to a DMRS symbol in a region between two DMRS symbols. As a specific example, if X corresponds to 5, a priority of a time index for UCI mapping can be defined as 4>9>5>8>6.

As a different example, UCI can be preferentially mapped to the Y number of symbols from a symbol close to a DMRS symbol at the outside of a region between two DMRS symbols except the X number of symbols close to the DMRS symbol in a region between two DMRS symbols. As a specific example, if X corresponds to 2 and Y corresponds to 2, a priority of a time index for UCI mapping can be defined as {4, 9}>{2, 11}>{5, 8}>{1, 12}> . . . .

The aforementioned UCI mapping method via PUSCH can be applied not only to a UCI piggyback PUSCH case but also to general PUSCH mapping of UCI for (aperiodic) CSI feedback.

UCI Mapping According to Dynamic DM-RS Insertion

In order to reduce DMRS transmission overhead, DMRS for multiple UL sTTIs is transmitted within the number of sTTIs less than the multiple UL sTTIs. And, the number of sTTIs less than the multiple UL sTTIs is shared. This is referred to as a dynamic DMRS insertion method. In particular, when a DMRS is transmitted to more promptly perform channel estimation and demodulation, the DMRS can be mapped to a first symbol within sTTI.

When a plurality of UL sTTIs are scheduled to a UE and a DMRS is mapped to a first symbol only of the first sTTI among a plurality of the UL sTTIs, the remaining sTTIs except the first sTTI are more influenced by time variance of a channel in the latter symbol. As a result, it is highly probable that accuracy of estimation performance is degraded. Hence, it may be able to define a rule that UCI is sequentially inserted from a first symbol of sTTI for sTTI to which DMRS is not mapped in consideration of reliability of UCI. For example, it may be able to define a rule that a coded symbol is to be allocated to the first symbol first in sTTI in an ascending (descending) order of a frequency index from a minimum (maximum) frequency index.

As a different method, when a plurality of UL sTTIs are scheduled to a UE and a DMRS is mapped to a first symbol only of a first sTTI, it may be able to define a rule that UCI is mapped in the first sTTI only. Or, when a plurality of UL sTTIs are scheduled to a UE and a DMRS is mapped within a part of a plurality of the UL sTTIs only, it may be able to define a rule that UCI is mapped within sTTI during which a DMRS is transmitted/included only.

Or, it may be able to preferentially map UCI within sTTI during which a DMRS is transmitted/included. Although UCI is mapped to all REs capable of mapping the UCI within a corresponding sTTI, if symbols to which UCI is to be mapped are left, it may be able to define a rule that the UCI is to be sequentially mapped to a symbol of sTTI close to a DMRS symbol first.

When scheduling is performed by multi-TTI scheduling, if a DMRS is transmitted within a partial sTTI only according to the dynamic DMRS insertion scheme, an index of sTTI at which UCI is to be transmitted can be explicitly signaled via a dynamic control signal (e.g., DCI) or can be configured via higher layer signaling.

UCI Mapping 2 According to Dynamic DM-RS Insertion

In case of a TTI having a short TTI length, if a DMRS of a symbol is transmitted in every sTTI, it is not preferable in terms of transmission efficiency. Hence, when a plurality of contiguous sTTIs are scheduled to a UE, a dynamic DMRS insertion method is considering. According to the method, a network dynamically indicates whether or not a DMRS is transmitted in every sTTI via dynamic signaling. In this case, it is necessary to define a UCI mapping rule according to whether or not a DMRS is transmitted.

If a short TTI operation is set or a specific short TTI length (e.g., a specific DL TTI length (group) during which UL grant DCI is transmitted or a specific UL TTI length (group) of PUSCH scheduled by UL grant DCI) is configured, it may be able to define a rule that UCI is to be mapped to the predetermined number of symbols and/or a symbol of a time index predetermined/defined in specific time duration (e.g., subframe) only. In this case, the number of symbols to which the UCI is to be mapped and/or the time index of the symbol can be independently and differently configured according to a TTI length.

Specifically, a symbol to which UCI is mapped can be defined by a first symbol of every sTTI. It may be able to define a rule that UCI is to be mapped to a first data symbol except a corresponding DMRS symbol only when a DMRS is transmitted in a first symbol during a specific sTTI. The proposal can be similarly applied to a case that various TTI lengths or subcarrier spacing are configured.

UCI Piggyback Rule

When CA is configured, UCI piggybacked via sPUSCH can be transmitted by bundling cells of which a TTI size (e.g., TTI size for sPDCCH/sPDSCH or sPUCCH/sPUSCH) is the same. Or, if multiple TTI sizes are supported to the same cell, a UCI transmission group can be configured according to a TTI size for sPDCCH/sPDSCH or sPUCCH/sPUSCH. More specifically, if each of a plurality of cells supports multiple TTI lengths (or sizes), TTIs having the same TTI length may belong to the same group over the total TTI length of a plurality of the cells.

Subsequently, each UCI group can be piggybacked or transmitted via a different PUSCH or a PUCCH. Some of the UCI groups are transmitted and some of the UCI groups can be dropped. The PUSCH and the PUCCH on which the UCI group is transmitted may have a different TTI size in the same cell or can be transmitted in a different cell. When a UCI group is transmitted or dropped, it may apply criteria described in the following. (1) It may be able to determine whether to transmit or drop a UCI group according to a TTI size of the UCI group (i.e., as a TTI size is smaller, a priority is higher). (2) It may be able to determine whether to transmit or drop a UCI group according to a UCI type (e.g. HARQ-ACK, CSI reporting type) of the UCI group. More specifically, the UCI type can be specifically selected from a UCI group (top priority based on UCI type).

More specifically, a network can inform a UE of a group of cells piggybacked with UCI. In this case, the UE may assume that a TTI length set to sPUCCH is the same according to a group. Specifically, it may not be related to a TTI length of sPDCCH. If a different sPUCCH TTI length is set to the same group, a minimum TTI length can be assumed as a basic sPUCCH transmission TTI. It may use information on the length as a value for determining the timing at which sPUSCH is transmitted. In particular, such an operation related to a short TTI as a timer and the like can be performed based on the TTI length of the sPUCCH. In this case, the TTI length of the sPUCCH may correspond to legacy 1 msec TTI length. In particular, all configurations may operate based on the TTI length (related to uplink). The configuration can be commonly applied to cells belonging to the same group.

On the contrary, the TTI length for sPDCCH can be used as a reference for downlink timing. In this case, if cross-carrier scheduling is performed, it may not permit cross-carrier scheduling between cells having a different TTI length or it may select a minimum or maximum length from among TTI lengths different from each other as a basic TTI length of an operation. In this case, timing can be applied using a common length, a minimum TTI length, or a maximum TTI length.

In this case, it may be able to define a rule that a piggybacked cell is determined by a cell having a lowest or highest index among PUSCH transmission cells having a TTI length selected or determined as a basic TTI length. Or, it may be able to define a rule that a cell in which UCI of cells corresponding to a short TTI is piggybacked is to be determined by a specific cell configured in advance via higher layer signaling or physical layer signaling.

As a different proposal, it may be able to define rule that UCI of cells corresponding to the remaining TTIs lengths (e.g., TTI size for sPDCCH/sPDSCH or sPUCCH/sPUSCH) except for a legacy TTI length (i.e., 1 msec) are piggybacked in a manner of being bundled. In this case, it may be able to define a rule that a piggybacked cell is determined by a cell corresponding to the remaining TTIs except for a legacy TTI and the cell having a lowest (or highest) index among PUSCH transmission cells. Or, it may be able to define a rule that a piggybacked cell is determined by a cell corresponding to the remaining TTIs except for a legacy TTI and the cell having a shortest or longest TTI among PUSCH transmission cells. Or, it may be able to define a rule that a piggybacked cell is determined by a specific cell which is configured via higher layer signaling or physical layer signaling in advance.

As a further different proposal, it may be able to piggyback UCI of cells configured via higher layer signaling/ physical layer signaling only using a short PUSCH. In this case, it may be able to define a rule that a piggybacked cell is determined by a cell having a lowest (or highest) index among PUSCH transmission cells. Or, it may be able to define a rule that a piggybacked cell is determined by a cell having a lowest (or highest) index among short PUSCH transmission cells. Or, it may be able to define a rule that a piggybacked cell is determined by a specific cell which is configured via higher layer signaling or physical layer signaling in advance.

As a further different proposal, if sPUSCH is configured to be transmitted, it may be able to define a rule that UCI for all cells is to be piggybacked with the sPUSCH.

As a further different proposal, if a cell (Pcell) in which PUCCH is transmitted is different from a cell (specific Scell) scheduled to transmit PUSCH and a specific TTI is set to each of the cells, UCI can be transmitted to a cell having a specific TTI based on a predetermined rule. For example, in order to promptly transmit UCI, UCI can be transmitted to a cell having a relatively short TTI. If a cell having a shortest TTI corresponds to a Pcell, it may be able to define a rule that the cell drops data, transmits the data at the timing delayed as much as predetermined or signaled time, or transmits UCI on PUCCH without a piggyback operation. Or, if a cell in which PUCCH is transmitted is different from a cell scheduled to transmit PUSCH and a specific TTI is set to each of the cells, it may be able to define a rule that the cell always drops data, transmits the data at the timing delayed as much as predetermined or signaled time, or transmits UCI on PUCCH.

As a further different proposal, when a short TTI is configured, it may be able to define a rule that a UE piggybacks A/N with PUSCH without a scheduled UL-SCH (without a UL grant). This rule can be applied only when a feedback amount (bit number) of A/N is equal to or greater than a specific value or when a coding rate is equal to greater than specific value at the time of transmitting A/N on PUCCH. In this case, it may be able to define a rule that scheduling information (e.g., resource allocation, MCS, DMRS CS, etc.) of PUSCH on which A/N is to be transmitted uses a predetermined value. In this case, a PUSCH transmission cell may correspond to a cell indicated via higher layer or physical layer signaling or a specific cell (e.g., a cell having a lowest (or highest) index) among Scell.

As a further different proposal, PUCCH/PUSCH simultaneous transmission within a short TTI can be set to a UE via separate higher layer signaling. Or, if a legacy PUCCH/ PUSCH simultaneous transmission is set to a UE via higher layer signaling, it may be able to define a rule that the UE performs the PUCCH/PUSCH simultaneous transmission within a short TTI as well.

When a UE performs PUCCH/PUSCH simultaneous transmission, it may be able to define a rule that the UE transmits partial UCI on PUCCH and transmits the remaining UCI by piggybacking the remaining UCI on a short PUSCH.

A type of UCI transmitted on PUCCH/PUSCH can be defined/promised in advance. Or, partial UCI is preferentially mapped to a channel and the remaining UCI can be mapped to the remaining channel according to a priority induced by combining all or a part of conditions including "TTI length (or size)", and/or "resource amount assigned to each channel", and/or "UCI type (e.g. HARQ-ACK, CSI reporting type)", and/or "TTI end timing", and the like.

In this case, a UCI combination transmitted on PUCCH and a UCI combination transmitted on PUSCH can be differently configured according to a PUCCH TTI length (or size) and/or PUSCH TTI length (or size).

According to current LTE standard, if conditions described in the following are satisfied, a UE performs triggered aperiodic CSI feedback only without a transport block for UL-SCH (uplink shared channel). For clarity, as mentioned in the foregoing description, when a UE transmits UCI only via PUSCH without UL-SCH, it is referred to as "UCI only PUSCH feedback".

When DCI format 0 is used, I_MCS=29 or DCI format 4 is used, 1 transport block (TB) is enabled only, I_MCS of the enabled TB corresponds to 29, and the number of transmission layers corresponds to 1, When CSI request bit field is 1 bit, aperiodic CSI report is triggered, and N_PRB is equal to or less than 4, Or, when CSI request bit field is 2 bits, aperiodic CSI report is triggered for one serving cell, and N_PRB is equal to or less than 4, Or, when CSI request bit field is 2 bits, aperiodic CSI report is triggered for a plurality of serving cells, and N_PRB is equal to or less than 20, Or, when CSI request bit field is 2 bits, aperiodic CSI report is triggered for a CSI process, and N_PRB is equal to or less than 4, Or, when CSI request bit field is 2 bits, aperiodic CSI report is triggered for a plurality of CSI processes, and N_PRB is equal to or less than 20

If a legacy condition for UCI only PUSCH feedback is identically maintained for a UE supporting a short TTI, a coding rate is excessively increased and it may cause a problem of degrading UCI reception performance. Hence, it may be able to define a rule that the UE supporting the short TTI performs the UCI only PUSCH feedback when CSI request bit field is 2 or 3 bits, aperiodic CSI report is triggered for a CSI process, and N_PRB is equal to or less than X.

Similarly, it may be able to define a rule that the UE supporting the short TTI performs the UCI only PUSCH feedback when CSI request bit field is 2 or 3 bits, aperiodic CSI report is triggered for a plurality of CSI processes, and N_PRB is equal to or less than Y. In this case, the X and the Y correspond to predetermined values different from 4 or 20. The values can be differently configured according to a TTI length. Or, the X and the Y may correspond to values configured via higher layer (or physical layer) signaling and can be differently configured according to a TTI length.

More generally, when a short TTI operation is set to a UE, the number of N_PRB that triggers UCI only feedback can be defined or signaled by a value different from a legacy value. Specifically, the number of N_PRB can be independently and differently configured according to a DL TTI length (group) in which UL grant DCI is transmitted or a UL TTI length (group) scheduled by UL grant DCI. For example, when a short TTI operation is set to a UE, a condition for triggering the UCI only PUSCH feedback can be defined as follows.

When DCI format 0 is used, I_MCS=29 or DCI format 4 is used, 1 transport block (TB) is enabled only, I_MCS of the enabled TB corresponds to 29, and the number of transmission layers corresponds to 1, When CSI request bit field is 1 bit, aperiodic CSI report is triggered, and N_PRB is equal to or less than 4

Or, when CSI request bit field is 2 bits, aperiodic CSI report is triggered for one serving cell, and N_PRB is equal to or less than 4

Or, when CSI request bit field is 2 bits, aperiodic CSI report is triggered for a plurality of serving cells, and N_PRB is equal to or less than Y Or, when CSI request bit field is 2 bits, aperiodic CSI report is triggered for a CSI process, and N_PRB is equal to or less than X Or, when CSI request bit field is 2 bits, aperiodic CSI report is triggered for a plurality of CSI processes, and N_PRB is equal to or less than Y Or, Or, when CSI request bit field is 3 bits, aperiodic CSI report is triggered for a CSI process, and N_PRB is equal to or less than X Or, Or, when CSI request bit field is 3 bits, aperiodic CSI report is triggered for 2 to 5 CSI processes, and N_PRB is equal to or less than Y Or, when CSI request bit field is 3 bits and aperiodic CSI report is triggered for 5 or more CSI processes In this case, the X and the Y correspond to predetermined values different from 4 or 20. The values can be differently configured according to a TTI length (group). Or, the X and the Y may correspond to values configured via higher layer (or physical layer) signaling and can be differently configured according to a TTI length (group).

If a short TTI operation is set to a UE or a specific short TTI length (e.g., a specific DL TTI length (group) during which UL grant DCI is transmitted or a specific UL TTI length (group) of PUSCH scheduled by UL grant DCI) is configured, it may be able to define a rule that the UCI only PUSCH feedback is to be triggered irrespective of the number of N_PRB allocated for PUSCH. Specifically, if a short TTI is configured, a condition for triggering the UCI only PUSCH feedback can be configured by a combination of I_MCS, and/or the number of enabled transport blocks, and/or the number of transmission layers, and/or the number of CSI request bits, and/or the number of cells/CSI processes at which CSI is to be measured, and the like. The present rule can be applied to a specific condition(s) only among the conditions {the number of CSI request bits, the number of cells/CSI processes}.

As a further different proposal, when the number of coded symbols (i.e., REs corresponding to the coded symbols) for transmitting UCI on PUSCH is calculated, a value of beta offset can be independently and differently configured according to a TTI length. In this case, the beta offset corresponds to a design parameter used for determining the number of coded symbols for UCI piggyback transmission. A UE can perform UCI transmission via piggyback on PUSCH by applying (by determining an RE in which UCI is transmitted and performing UCI mapping on the determined RE) a different beta offset value according to a TTI length. Similarly, when the number of coded symbols for transmitting UCI in PUSCH is calculated, a beta offset value can be differently and independently configured according to subcarrier spacing or numerology. A UE can perform UCI transmission via piggyback on PUSCH by applying a different beta offset value (by determining an RE in which UCI is transmitted and performing UCI mapping on the RE) according to subcarrier spacing or numerology.

As a further different proposal, if a length of a TTI during which UCI piggyback PUSCH is to be transmitted is equal to or less than a prescribed length or subcarrier spacing is equal to or greater than prescribed subcarrier spacing, it may be able to define a rule that UCI piggyback is not allowed.

As a further different proposal, it may be able to define a rule that PUCCH having a legacy TTI length is piggybacked with PUSCH having a legacy TTI length and sPUCCH is piggybacked with sPUSCH. Or, it may be able to define a rule that a TTI length of (s)PUSCH is determined according to a TTI length of (s)PUCCH. For example, if a TTI length is equal to or less than a (predefined or signaled) specific threshold, the PUCCH is piggybacked with a specific PUSCH (hereinafter, PUSCH_1). Otherwise, the PUCCH is piggybacked with a different PUSCH (hereinafter, PUSCH_2). In this case, the PUSCH_1 may correspond to PUSCH having a relatively short TTI length compared to the PUSCH_2. Specifically, the present proposal can be applied only when a UE having 2-cluster UL transmission capability only transmits three or more UL channels at the same time.

PUSCH Power Control

According to current LTE standard TS 36.213, when PUSCH transmission is performed, transmit power of a UE can be determined as follows.

If the UE transmits PUSCH without a simultaneous PUCCH for the serving cell c, then the UE transmit power $P_{PUSCH,c}(i)$ for PUSCH transmission in subframe i for the serving cell c is given by $$P_{PUSCH,c}(i) = \min \begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases} [dBm]$$

where, $P_{CMAX,c}(i)$ is the configured UE transmit power defined in [6] in subframe i for serving cell c . . . (ellipsis) . . .

$\Delta_{TF,c}(i) = 10 \log_{10}((2^{BPRE \cdot K_s} - 1) \cdot \beta_{offset}^{PUSCH})$ for $K_S = 1.25$ and 0 for $K_S = 0$ where $K_S$ is given by the parameter deltaMCS-Enabled provided by higher layers for each serving cell c. BPRE and $\beta_{offset}^{PUSCH}$, for each serving cell c, are computed as below. $K_S = 0$ for transmission mode 2.

BPRE = $O_{CQI}/N_{RE}$ for control data sent via PUSCH without UL-SCH data and $$\sum_{r=0}^{C-1} K_r / N_{RE}$$

For other cases.

where C is the number of code blocks, $K_r$ is the size for code block r, $O_{CQI}$ is the number of CQI/PMI bits including CRC bits and $N_{RE}$ is the number of resource elements determined as $N_{RE} = M_{sc}^{PUSCH-initial} \cdot N_{symb}^{PUSCH-initial}$, where C, $K_r$, $M_{sc}^{PUSCH-initial}$ and $N_{symb}^{PUSCH-initial}$ are defined in [4].

$\beta_{offset}^{PUSCH} = \beta_{offset}^{CQI}$ for control data sent via PUSCH without UL-SCH data and 1 for other cases.

In the equation above, $N_{RE}$ corresponds to the entire number of REs of a resource region scheduled to a UE to transmit PUSCH. When UCI is piggybacked, the same value is used. In case of introducing a short TTI, a ratio of REs used for UCI piggyback to the entire scheduled resource region can be relatively increased due to the constraint of a frequency resource. In case of introducing a short TTI, it may be able to define a rule that $N_{RE}$ of the equation indicates the number of remaining REs except the REs used for the UCI piggyback among the entire scheduled resource region. If the rule above is applied, since PUSCH transmit power, which is actually applied to the UE transmitting PUSCH with a short TTI, is increased, it is expected that it is able to increase reception performance of UL-SCH which is transmitted together with UCI.

When a value of transmit power, which is calculated by defining the $N_{RE}$ as the number of remaining REs except REs used for performing UCI piggyback among the entire scheduled resource region, becomes greater than "maximum transmit power (e.g., $P_{CMAX,c}^{(i)}$) set to a UE" and a power-limited situation occurs, it may be able to define a rule that transmit power is configured by reusing the $N_{RE}$ according to a legacy definition.

As a different proposal, when a short TTI is introduced, if a power-limited situation occurs (in other word, if a calculated power value is greater than "maximum transmit power (e.g., $P_{CMAX,c}^{(i)}$) set to a UE", it may be able to define a rule that the UE drops PUSCH and transmits UCI via PUCCH.

Or, it may be able to define a rule that a UE calculates a transmit power value using partial RBs only among a resource region scheduled to the UE to transmit PUSCH and transmits the PUSCH is transmitted using the partial RBs. This is aimed for reducing a loss of dropping all of the PUSCH when the power-limited situation occurs. In the rule, the number of RBs to be dropped without being used among the scheduled resource region or a ratio of the number of RBs to be dropped to the entire number of RBs can be defined/promised in advance (according to a TTI length or commonly) or can be provided to the UE via signaling.

Option 1: According to current standard, BPRE used in the equation above becomes (1) the number of CQI/PMI_CRC bits for a case of PUSCH without UL-SCH, (2) a value resulted from dividing the sum of code block size by $N_{RE}$. The BPRE can be applied to power allocation in a manner of being redefined as follows.

When UCI is piggybacked, BPRE can be defined as a value resulted from dividing "the sum of each code block size" and "number of CQI/PMI+CRC bits" by N_RE. Specifically, when UCI is piggybacked with sPUSCH, the abovementioned proposal can be applied. In case of applying the proposal, if PUSCH transmit power, which is actually applied to a UE transmitting PUSCH with a short TTI, is increased, it may be able to expect that reception performance of UL-SCH, which is transmitted together with the UCI, can be increased.

Option 2: When UCI is piggybacked, it may be able to define a rule that actual PUSCH transmit power is increased by applying an additional offset to power allocation for PUSCH.

The offset may correspond to (1) an independent value individually determined according to the number of symbols corresponding to UCI, (2) an independent value individually determined by a TTI length or subcarrier spacing, or (3) an independent value individually determined by a TTI length group (specific multiple TTI lengths can be defined as a single TTI length group) or a subcarrier spacing group and can be defined in advance or can be configured via higher layer signaling or physical layer signaling.

Figure 10:
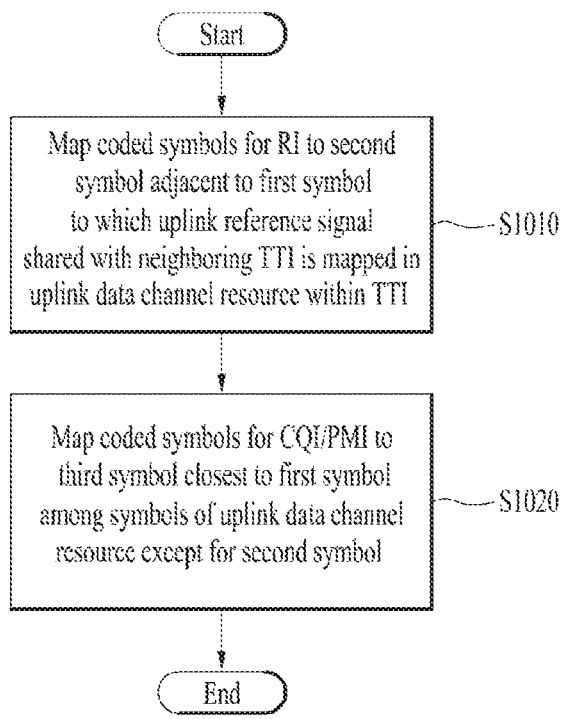
FIG. 10 is a flowchart illustrating an operation of a terminal.

FIG. 10 is a flowchart illustrating an operation of a terminal according to an embodiment of the present invention.

The terminal may be configured to support multiple TTI (transmission time interval) lengths in a wireless communication system. The terminal may perform an operation for mapping uplink control information to an uplink data channel resource.

The terminal may map coded symbols for a rank indicator (RI) to each of resource elements in an ascending order of a frequency index from a resource element of a minimum frequency index in a second symbol adjacent to a first symbol to which an uplink reference signal is mapped in an uplink data channel resource within a TTI of a predetermined length among the multiple TTI lengths [S1010]. Subsequently, the terminal may map coded symbols for a channel quality indicator (CQI) or a precoding matrix indicator (PMI) to each of resource elements in an ascending order of a frequency index from a resource element of a minimum frequency index or in a descending order of a frequency index from a resource element of a maximum frequency index in a predetermined symbol of the uplink data channel resource [S1020].

When mapping is performed on a resource element of the maximum frequency index in the specific symbol, if there are remaining coded symbols for the CQI or PMI, the terminal may map coded symbols for the remaining CQI or PMI to each of resource elements in an ascending order of a frequency index from a resource element of the minimum frequency index in a next symbol of the predetermined symbol.

The terminal may map coded symbols for ACK/NACK (acknowledgement/non-acknowledgement) to each resource element in a descending order of a frequency index from a resource element of the maximum frequency index in the second symbol.

In this case, the number of coded symbols of uplink control information to be transmitted via an uplink data channel resource within the TTI may depend on a length of the TTI or subcarrier spacing of the TTI or may be determined according to the length of the TTI or a subcarrier spacing of the TTI. Or, an offset value for calculating the number of coded symbols of uplink control information to be transmitted via an uplink data channel resource within the TTI may be determined according to the length of the TTI or the subcarrier spacing of the TTI.

And, the maximum number of symbols to which coded symbols of uplink control information is mapped in an uplink data channel resource within the TTI may be determined according to a length of the TTI.

And, power for transmitting the uplink data channel resource can be determined based on the number of resource elements except for resource elements to which the uplink control information is mapped within the TTI.

And, when multiple TTIs sharing the uplink reference signal are scheduled to the terminal, an coded symbol for the uplink control information may be mapped within a TTI in which the uplink reference signal is mapped or transmitted.

And, the coded symbol for the CQI or the PMI may be mapped to a resource element of an RB (resource block) of a minimum index or a maximum index among RBs except an RB to which the coded symbol for the RI is mapped.

And, the predetermined symbol may correspond to a symbol closest to the first symbol among symbols except for the second symbol in the uplink data channel resource.

And, when the predetermined symbol corresponds to the second symbol, the coded symbol for the CQI or the PMI may be mapped to each resource element in an ascending order of a frequency index or in a descending order of the frequency index from a frequency index apart from a resource to which the coded symbols for the RI is mapped by a predefined size.

Figure 11:
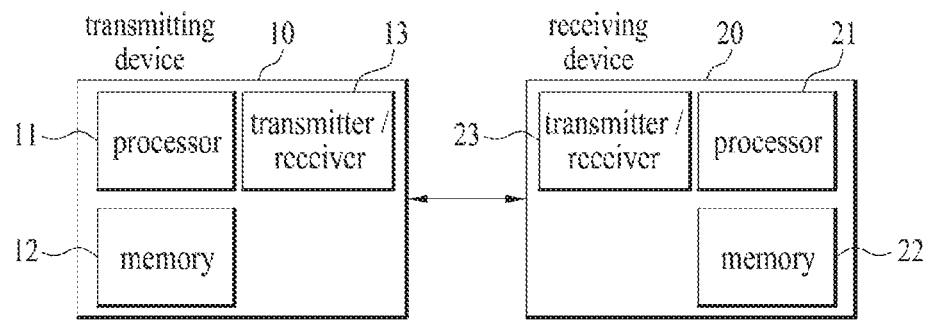
FIG. 11 is a block diagram of a device for implementing embodiment(s) of the present invention.

FIG. 11 is a block diagram illustrating a transmitting device 10 and a receiving device 20 configured to implement embodiments of the present invention. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present invention, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or receiving device may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention can be used for such a wireless communication device as a terminal, a relay, a base station, and the like.

What is claimed is:

1. A method of transmitting an uplink signal for a terminal configured to support multiple TTI (transmission time interval) lengths in a wireless communication system, the method comprising:
    mapping rank indicator (RI) information to elements on a column of an element matrix in a descending order of a row index from a maximum value of row indexes of the column;

mapping ACK/NACK (acknowledgement/non-acknowledgement) information to the elements on the column in a descending order of the row index from a maximum value of the row indexes of the column among remaining elements except the elements of the column used for the RI information; and transmitting the uplink signal including the RI information and the ACK/NACK information through a SC-FDMA (Single Carrier Frequency Division Multiple Access) symbol with a TTI length among multiple TTI lengths, wherein the number of columns of the element matrix corresponds to the number of SC-FDMA symbols carrying the uplink signal in a subframe.

2. The method of claim 1, wherein an uplink data channel is configured for the terminal to transmit simultaneously with an uplink control channel with a TTI.

3. The method of claim 1,
wherein an offset value for calculating the number of symbols of uplink control information to be transmitted via an uplink data channel with a TTI is determined according to a length of the TTI, and
wherein the uplink control information includes the RI information and the ACK/NACK information.

4. The method according to claim 1, further comprising:
determining that the number of elements to which the RI information and the ACK/NACK information are to be mapped is greater than the number of the row indexes on the column; and
overwriting the ACK/NACK information to the elements to which the RI information is to be mapped.

5. The method according to claim 1, wherein the number of the row indexes on the column corresponds to the number of subcarriers of the subframe.

6. The method according to claim 1, wherein the TTI length is less than 1 MS.

7. The method according to claim 1, wherein the RI information is mapped from an SC-FDMA symbol closest to a symbol to which a reference signal in a TTI.

8. A terminal configured to support multiple TTI (transmission time interval) lengths in a wireless communication system, the terminal comprising:
a transmitter and a receiver; and
a processor that controls the transmitter and the receiver,
wherein the processor is configured to:
map rank indicator (RI) information to elements on a column of an element matrix in a descending order of a row index from a maximum value of row indexes of the column; and
map ACK/NACK (acknowledgement/non-acknowledgement) information to the elements on the column in a descending order of the row index from a maximum value of the row indexes of the column among remaining elements except the elements of the column used for the RI information,
wherein the processor controls the transmitter to transmit the uplink signal including the RI information and the ACK/NACK information through a SC-FDMA (Single Carrier Frequency Division Multiple Access) symbol with a TTI length among multiple TTI lengths, and
wherein the number of columns of the element matrix corresponds to the number of SC-FDMA symbols carrying the uplink signal in a subframe.

9. The terminal of claim 8, wherein an uplink data channel is configured for the terminal to transmit simultaneously with an uplink control channel with a TTI.

10. The terminal of claim 8, wherein an offset value for calculating the number of symbols of uplink control information to be transmitted via an uplink data channel within a TTI is determined according to a length of the TTI, and
wherein the uplink control information includes the RI information and the ACK/NACK information.

11. The terminal of claim 8, wherein the processor is configured to:
determine that the number of elements to which the RI information and the ACK/NACK information are to be mapped is greater than the number of the row indexes on the column; and
overwrite the ACK/NACK information to the elements to which the RI information is to be mapped.

12. The terminal of claim 8, wherein the number of the row indexes on the column corresponds to the number of subcarriers of the subframe.

13. The terminal of claim 8, wherein the TTI length is less than 1 ms.

14. The terminal of claim 8, wherein the RI information is mapped from an SC-FDMA symbol closest to a symbol to which a reference signal in a TTI.

* * * * *